(12) United States Patent
Weng et al.

(10) Patent No.: US 7,773,883 B1
(45) Date of Patent: Aug. 10, 2010

(54) SINGLE-FIBER OPTICAL RING NETWORKS BASED ON OPTICAL DOUBLE SIDEBAND MODULATION

(75) Inventors: Chia-Kai Weng, Hsinchu (TW); Winston I. Way, Irvine, CA (US)

(73) Assignee: Vello Systems, Inc., Menlo Park, CA (US)

( * ) Notice: Subject to any disclaimer, the term of this patent is extended or adjusted under 35 U.S.C. 154(b) by 605 days.

(21) Appl. No.: 11/744,757

(22) Filed: May 4, 2007

(51) Int. Cl.
*H04J 14/02* (2006.01)
(52) U.S. Cl. ............................. 398/83; 398/3; 398/95
(58) Field of Classification Search .......... 398/3.46–48, 398/72, 82–83, 95
See application file for complete search history.

(56) References Cited

U.S. PATENT DOCUMENTS

| | | |
|---|---|---|
| 5,062,684 A | 11/1991 | Clyton et al. |
| 5,101,450 A | 3/1992 | Olshansky |
| 5,239,401 A | 8/1993 | Olshansky |
| 5,301,058 A | 4/1994 | Olshansky |
| 5,333,000 A | 7/1994 | Hietala et al. |
| 5,390,188 A | 2/1995 | Dawson et al. |
| 5,442,623 A | 8/1995 | Wu |
| 5,479,082 A | 12/1995 | Calvani et al. |
| 5,509,093 A | 4/1996 | Miller et al. |
| 5,539,559 A | 7/1996 | Cisneros et al. |
| 5,546,210 A | 8/1996 | Chraplyvy et al. |
| 5,596,436 A | 1/1997 | Sargis et al. |
| 5,600,466 A | 2/1997 | Tsushima et al. |
| 5,608,825 A | 3/1997 | Ip |
| 5,617,233 A | 4/1997 | Boncek |
| 5,625,478 A | 4/1997 | Doerr et al. |
| 5,663,820 A | 9/1997 | Shiragaki |
| 5,680,235 A | 10/1997 | Johansson |
| 5,696,614 A | 12/1997 | Ishikawa et al. |
| 5,710,650 A | 1/1998 | Dugan |
| 5,712,716 A | 1/1998 | Vanoli et al. |
| 5,717,795 A | 2/1998 | Sharma et al. |
| 5,734,493 A | 3/1998 | Jopson |
| 5,742,416 A | 4/1998 | Mizrahi |
| 5,745,273 A | 4/1998 | Jopson |
| 5,764,821 A | 6/1998 | Glance |
| 5,778,118 A | 7/1998 | Sridhar |
| 5,781,327 A | 7/1998 | Brock et al. |
| 5,784,184 A | 7/1998 | Alexander et al. |

(Continued)

FOREIGN PATENT DOCUMENTS

DE 19828614 12/1999

(Continued)

OTHER PUBLICATIONS

Adamczyk, et al. "All-Optical Output-Port Contention Resolution Using Subcarrier-Multiplexing", Optical Fiber Communications Conference 2000, Mar. 7-10, 2000, pp. 332-334.

(Continued)

*Primary Examiner*—Dzung D Tran
(74) *Attorney, Agent, or Firm*—Michael Bosworth; Claude A. S. Hamrick; IPxLaw Group LLP (57) ABSTRACT

Systems, apparatus and methods for implementing single-fiber optical ring networks based on double side band modulation.

12 Claims, 6 Drawing Sheets

U.S. PATENT DOCUMENTS

| | | | |
|---|---|---|---|
| 5,786,913 A | 7/1998 | Pfeiffer | |
| 5,796,501 A | 8/1998 | Sotom et al. | |
| 5,822,095 A | 10/1998 | Taga et al. | |
| 5,838,475 A | 11/1998 | Takeyari et al. | |
| 5,870,212 A | 2/1999 | Nathan et al. | |
| 5,880,870 A | 3/1999 | Sieben et al. | |
| 5,896,212 A | 4/1999 | Sotom et al. | |
| 5,917,638 A | 6/1999 | Franck et al. | |
| 5,923,449 A | 7/1999 | Doerr et al. | |
| 5,938,309 A | 8/1999 | Taylor | |
| 5,940,197 A | 8/1999 | Ryu | |
| 5,949,273 A | 9/1999 | Mourick et al. | |
| 5,949,560 A | 9/1999 | Roberts et al. | |
| 5,953,141 A | 9/1999 | Liu et al. | |
| 5,982,518 A | 11/1999 | Mizarahi | |
| 5,982,963 A | 11/1999 | Feng et al. | |
| 6,008,931 A | 12/1999 | Von Helmolt et al. | |
| 6,023,359 A | 2/2000 | Asahi | |
| 6,035,080 A | 3/2000 | Henry et al. | |
| 6,069,732 A | 5/2000 | Koch et al. | |
| 6,084,694 A | 7/2000 | Milton et al. | |
| 6,088,141 A | 7/2000 | Merli et al. | |
| 6,089,694 A | 7/2000 | Miltom et al. | |
| 6,118,566 A | 9/2000 | Price et al. | |
| 6,130,766 A | 10/2000 | Cao | |
| 6,163,553 A | 12/2000 | Pfeiffer | |
| 6,191,854 B1 | 2/2001 | Grasso et al. | |
| 6,192,173 B1 | 2/2001 | Solheim et al. | |
| 6,195,186 B1 | 2/2001 | Asahi | |
| 6,195,351 B1 | 2/2001 | Hiscock et al. | |
| 6,201,909 B1 | 3/2001 | Kewitsch et al. | |
| 6,208,441 B1 | 3/2001 | Jones et al. | |
| 6,211,980 B1 | 4/2001 | Terahara | |
| 6,222,654 B1 | 4/2001 | Frigo | |
| 6,259,836 B1 | 7/2001 | Dodds | |
| 6,271,946 B1 | 8/2001 | Chang et al. | |
| 6,285,479 B1 | 9/2001 | Okazaki et al. | |
| 6,339,663 B1 | 1/2002 | Leng et al. | |
| 6,351,323 B1 | 2/2002 | Onaka et al. | |
| 6,369,923 B1 | 4/2002 | Kuo et al. | |
| 6,385,204 B1 | 5/2002 | Hoefelmeyer et al. | |
| 6,404,535 B1 | 6/2002 | Leight | |
| 6,414,765 B1 | 7/2002 | Li et al. | |
| 6,433,904 B1 | 8/2002 | Swanson et al. | |
| 6,466,342 B1 | 10/2002 | Frigo et al. | |
| 6,525,852 B1 | 2/2003 | Egnell | |
| 6,525,857 B1 | 2/2003 | Way et al. | |
| 6,556,744 B1 | 4/2003 | Brimacombe et al. | |
| 6,560,252 B1 | 5/2003 | Colbourne et al. | |
| 6,580,537 B1 | 6/2003 | Chang et al. | |
| 6,590,681 B1 | 7/2003 | Egnell et al. | |
| 6,657,952 B1 | 12/2003 | Shiragaki et al. | |
| 6,661,976 B1 | 12/2003 | Gnauck et al. | |
| 6,701,085 B1 | 3/2004 | Muller | |
| 6,788,899 B2 | 9/2004 | Way | |
| 6,891,981 B2 | 5/2005 | Price et al. | |
| 6,895,184 B2 | 5/2005 | Way | |
| 6,970,655 B2 | 11/2005 | Ono et al. | |
| 7,003,231 B2 | 2/2006 | Way et al. | |
| 7,024,112 B2 | 4/2006 | Way | |
| 7,068,949 B2 | 6/2006 | Jung et al. | |
| 7,120,359 B2 | 10/2006 | Way | |
| 7,206,520 B2 | 4/2007 | Way et al. | |
| 2002/0012148 A1 | 1/2002 | Oksanen | |
| 2002/0015553 A1 | 2/2002 | Claringburn et al. | |
| 2002/0023170 A1 | 2/2002 | Seaman et al. | |
| 2002/0030877 A1 | 3/2002 | Way et al. | |
| 2002/0063928 A1 | 5/2002 | Hansen et al. | |
| 2002/0067523 A1 | 6/2002 | Way | |
| 2002/0080440 A1 | 6/2002 | Li et al. | |
| 2002/0114034 A1 | 8/2002 | Way | |
| 2002/0126350 A1 | 9/2002 | Sato et al. | |
| 2002/0135838 A1 | 9/2002 | Way | |
| 2003/0025961 A1* | 2/2003 | Way | 359/119 |
| 2003/0169470 A1 | 9/2003 | Alagar et al. | |
| 2003/0180047 A1 | 9/2003 | Way et al. | |
| 2004/0114926 A1* | 6/2004 | Kim et al. | 398/59 |
| 2004/0208561 A1 | 10/2004 | Kinoshita et al. | |
| 2005/0018600 A1 | 1/2005 | Tornar | |
| 2005/0025490 A1 | 2/2005 | Aoki et al. | |
| 2005/0078965 A1 | 4/2005 | Kim et al. | |
| 2005/0084262 A1* | 4/2005 | Oberg et al. | 398/19 |
| 2005/0141894 A1* | 6/2005 | Kim et al. | 398/83 |
| 2005/0158047 A1 | 7/2005 | Way et al. | |
| 2005/0185969 A1 | 8/2005 | Moeller et al. | |
| 2005/0201762 A1 | 9/2005 | Moeller et al. | |
| 2005/0286908 A1 | 12/2005 | Way | |
| 2006/0051092 A1 | 3/2006 | Way | |
| 2006/0140643 A1 | 6/2006 | Way et al. | |
| 2006/0269295 A1 | 11/2006 | Way | |
| 2006/0275035 A1 | 12/2006 | Way | |
| 2007/0086332 A1 | 4/2007 | Way et al. | |

FOREIGN PATENT DOCUMENTS

| | | |
|---|---|---|
| WO | WO96/32787 | 10/1996 |
| WO | WO01/67647 | 9/2001 |
| WO | WO01/67648 | 9/2001 |
| WO | WO02/23772 | 3/2002 |
| WO | WO02/058301 | 7/2002 |
| WO | WO04/002024 | 12/2003 |
| WO | WO2004/064259 | 7/2004 |
| WO | WO2006/002080 | 1/2006 |
| WO | WO2006/119375 | 11/2006 |
| WO | WO2007/044939 | 4/2007 |

OTHER PUBLICATIONS

Bannister, et al. "How Many Wavelengths Do We Really Need?, A Study of the Performance Limits of Packet Over Wavelengths", SPIE Optical Network Magazine, Apr. 2000, pp. 1-12.

Blumenthal, et al. "All-Optical Label Swapping with Wavelength Conversion for WDM-IP Networks with Subcarrier Multiplexed Addressing", IEEE Photonics Technology Letters, vol. 11, No. 11, Nov. 1999, pp. 1497-1499.

Bosco, G. et al., "Modulation formats suitable for ultrahigh spectral efficient WDM systems," IEEE J. Selected Topics in Quantum Electron. 10(22): 321-328 (Mar./Apr. 2004).

Bosco, G. et al., "On the use of NRZ, RZ, and CSRZ modulation at 40 Gb/s with narrow DWDM channel spacing," Journal of Lightwave Technology, p. 1694-1704, Sep. 2002.

Ramamurthy, Byrav, et al. "Wavelength Conversion in WDM Networking", IEEE Journal on Selected Areas in Communication, vol. 16, Sep. 1998, pp. 1061-1073.

Chao, et al. "A Photonic Front-End Processor in a WDM ATM Multicast Switch", Journal of Lightwave Technology, vol. 18, No. 3, Mar. 2000, pp. 273-285.

Daikoku, M. et al., "Performance comparison of modulation formats for 40Gb/s DWDM transmission systems, " paper OFN2, Optical Fiber Communications (OFC) Conference, 2005, 3 pages.

Derr, et al. "An Optical Infrastructure for Future Telecommunications Networks", IEEE Communications Magazine, vol. 33, No. 11, Nov. 1995 pp. 84-88.

English language Translation of DE 19828614, published Dec. 30, 1999, entitled "Method and device for optical transmission via light waveguides", 10 pages.

Frankel, et al. "Optical Single-Sideband Suppressed-Carrier Modulator for Wide-Band Signal Processing", Journal of Lightwave Technology, vol. 16, No. 5, May 1998, pp. 859-863.

Gerstel, O. and R. Ramaswami, "Optical layer survivability: a service perspective," IEEE Communications Magazine, pp. 104-113, Mar. 2000.

Ghani, "Lambda-Labeling: A Framework for IP-Over-WDM Using MPLS", Optical Networks Magazine, vol. 1, No. 2, Apr. 2000, pp. 45-58.

Gnauck, A.H. and P.J. Winzer, "Optical phase shifted keyed transmission," Journal of Lightwave Technology 23(1): 115-130 (Jan. 2005).

Goldstein et al., "Performance implications of component crosstalk in transparent lightwave netowrks," IEEE Photonics Technolog Letters 6(5): 657-660, (May 1994).

Heismann, "Polarization Mode Dispersion: Fundamentals and Impact on Optical Communication System", European Conference of Optical Communications (ECOC '98), Sep. 20-24, 1998, Madrid, Spain, vol. 2, pp. 51-79 (1998).

Hill, et al. "Multigigabit Subcarrier Multiplexed Coherent Lightwave System", Journal of Lightwave Technology, vol. 10, No. 11, Nov. 1992, pp. 1656-1664.

Hui, R., "Multitributary OFDM optical transmitter using carrier-suppressed optical single-sideband modulation," Optical Fiber Communications Conference, 2003. OFC 2003, Mar. 23-28, 2003 pp. 92-93.

Hui et al., "10 Gb/s SCM system using optical single side-band modulation," Optical Fiber Communication Conference and Exhibit, 2001. OFC 2001, vol. 1, Issue , 2001 pp. MM4-1-MM4-4

ITU-T Recommendation G.692, "Optical Interfaces for Multichannel Systems with Optical Amplifiers", Oct. 1998, pp. 14-23.

Izutsu, et al., "Integrated Optical SSB Modulation/Frequency Shifter", IEEE Journal of Quantum Electronics, vol. QE-17, No. 11, Nov. 1981, pp. 2225-2227.

Jiang et al., "Multi-Lane PMD Reliability and Partial Fault Protection (PFP)," IEEE 802.3ba, Jan. 2008, 25 pages, http://www.ieee802.org/3/ba/public/jan08/jiang_01_0108.pdf [accessed on Apr. 8, 2008].

Johansson, B.S. et al., "Flexible bus: a self-restoring optical ADM ring architecture," Electronic Letters, vol. 32, No. 25, pp. 2338-2339, Dec. 1996.

Joo, Y. et al., "1-fiber WDM self-healing ring with bidirectional optical add/drop muliplexers," IEEE Photon. Technol. Lett. 16(2):: 683-685 (Feb. 2004).

Kaminow, I. and T. Li, (Eds.), *Optical Fiber Telecommunications IVB: Systems and Impairments*, San Diego: Academic Press, Chapter 16, pp. 868-876 (2002).

Khrais, et al. "Effects of Cascaded Misaligned Optical (de)Multiplexers on Multiwavelength Optical Network Performance", OFC, Paper ThD-4, Feb. 1996.

Kinoshita et al., "Metro WDM network with photonic domains," Optical Fiber Communication Conference OFC 2004, vol. 1, Feb. 23-27, 2004, 3 pages.

Kitayama, "Highly Spectrum Efficient OFDM/PDM Wireless Networks by Using Optical SSB Modulation", Journal of Lightwave Technology, vol. 16, No. 6, Jun. 1998, pp. 969-976.

Lee, et al. "A Wavelength-Convertible Optical Network", Journal of Lightwave Technology, vol. 11, May/Jun. 1993, p. 962.

Lyubomirsky, I. and C. Chien, "Tailoring the duobinary pulse shape for optimum performance," J. Lightwve Technology 23(11): 3732-3736 (Nov. 2005).

Masetti, et al. "High Speed, High Capacity ATM Optical Switches for Future Telecommunication Transport Networks", IEEE Journal on Selected Areas in Communications, vol. 14, No. 5, Jun. 1996, pp. 979-998.

Ohn, et al. "Dispersion Variable Fibre Bragg Grating Using a Piezoelectric Stack", Electronic Letters, vol. 32, No. 21, Oct. 10, 1996, pp. 2000-2001.

Okamoto, et al. "Optical Path Cross-Connect Systems for Photonic Networks", Global Telecommunications Conference, Nov. 1993, vol. 1, pp. 474-480.

Ono, T. et al., "Characteristics of optical duobinary signals in terabit/s capacity, high spectral efficiency WDM systems," J. Lightwave Technology 16(5): 788-797, May 1998.

Ramos, et al. "Comparison of Optical Single-Sideband Modulation and Chirped Fiber Gratings as Dispersion Mitigating Techniques in Optical Millimeter-Wave Multichannel Systems", IEEE Photonics Technology Letters, vol. 11, No. 11, Nov. 1999, pp. 1479-1481.

Sano et al., "30×100 gb/s all-optical OFDM transmission over 1300 km SMF with 10 ROADM nodes", Technical Digest of ECOC 2007, Paper PDS1.7 (2007), 2 pages.

Sargis, P.D. et al., "10-G-b/s subcarrier muliplexed transmission over 490 km of ordinary single-mode fiber without dispersion compensation," IEEE Photon. Technol. Lett. 9(12):: 1658-1660, (Dec. 1997).

Shankar, "Duobinary Modulation for Optical Systems," Dec. 5, 2002 http://www.inphi-corp.com/products/whitepepers/DuobinaryModulationForOpticalSystems.pdf [accessed on Oct. 14, 2005], 10 pages.

Shi et al., "High-speed electrooptic modulator characterization using optical spectrum analysis," J. Lightwave Technol. 21(10): 2358-2367, (Oct. 2003).

Shtaif, M. and A.H. Gnauck, "The relation between optical duobinary modulation and spectral efficiency in WDM systems," IEEE Photon. Technol. Lett. 11(6): 712-714 (Jun. 1999_.

Sieben, et al. "Optical Single Sideband Transmission at 10 Gb/s Using Only Electrical Dispersion Compensation", Journal of Lightwave Technology, vol. 17, No. 10, Oct. 1999, pp. 1742-1748.

Smith, et al. "Broad-Band Millimeter-Wave (38 GHz) Fiber-Wireless Transmission System Using Electrical and Optical SSB Modulation to Overcome Dispersion Effects", IEEE Photonics Technology Letters, vol. 10, No. 1, Jan. 1998 pp. 141-144.

Smith et al., "Overcoming Chromatic-Dispersion Effects in Fiber-Wireless Systems Incorporating External Modulators," IEEE Transactions on Microwave Theory and Techniques 45(8): 1410-1415 (Aug. 1997).

Spring, et al. "Photonic Header Replacement for Packet Switching", Electronic Letters, vol. 29, No. 17, Aug. 19, 1993, pp. 1523-1525.

Sun, et al. "Tunable Compensation of Dispersion-Induced RF Power Degradation in Multiple-Channel SCM Transmission by Nonlinearly-Chirped FBG's", CLEO '99, 1999, pp. 316-317.

van den Borne, D. et al., "Coherent equalization versus direct detection for 111-Gb/s Ethernet transport," IEEE LEOS Summer Tropical Meetings, pp. 11-12, Jul. 23-25, 2007.

van Deventer et al., "Power penalties due to Brillouin and Rayleigh scattering in a bi-directional coherent transmission system," IEEE Photon. Lett. 6(2): 291-294 (Feb. 1994).

Walkin, "Multilevel Signaling for Increasing the Reach of 10 Gb/s Lightwave Systems", Journal of Lightwave Technology, vol. 17, No. 11, Nov. 1999 pp. 2235-2248.

Way, "Broadband Hybrid Fiber Coax Access System Technologies", New York Acacemic Press, 1998, pp. 253-300.

Way, "Subcarrier Multiplexed Lightwave System Design Considerations for Subscriber Loop Applications", Journal of Lightwave Technology, vol. 7, No. 11, Nov. 1989, pp. 1806-1818.

Way, W.I.., "Spectrally efficient parallel PHY for 100 GbE MAN and WAN," IEEE Applications and Practice (distributed with IEEE Communications Magazine). pp. 20-23, (Dec. 2007).

Weng, C. and W.I. Way, "A Single-Fiber Optical Unidirectional Path-Switched-Ring Network Using Double-Sideband-Suppressed Carrier Modulation Technique," Photonics Technology Letters, IEEE 18(21): 2236-2238 (Nov. 1, 2006).

Winzer, P. and G. Raybon, "100G Ethernet- a review of serial transport options," IEEE LEOS Summer Tropical Meetings, Jul. 23-25, 2007, pp. 7-8.

Wree, C. et al., "Coherent receivers for phase-shift keyed transmission," OFC/NFOEC, paper OMP6, 2007, 3 pages.

Wu, et al. "CSO Distortions Due to the Combined Effects of Self- and External-Phase Modulations in Long-Distance 1550-nm AM-CATV Systems", IEEE Photonics Technology Letters, vol. 11, No. 6, Jun. 1999, pp. 718-720.

Xie, C. et al., "Improvement of optical NRZ- and RZ-duobinary transmission systems with narrow bandwidth optial filters," IEEE Photon. Tech. Lett. 16(9): 2162-2164 (Sep. 2004).

Yonenaga, et al. "Dispersion-Tolerant Optical Transmission System Using Duobinary Transmitter and Binary Receiver", Journal of Lightwave Technology, vol. 15, No. 8, Aug. 1997, pp. 1530-1537.

Yonenaga et al., "Optical duobinary transmission system with no receiver sensitivity degradation," Electron Lett. vol. 31, No. 4., pp. 302-304 (Feb. 16, 1995).

* cited by examiner

SINGLE-FIBER OPTICAL RING NETWORKS BASED ON OPTICAL DOUBLE SIDEBAND MODULATION

BACKGROUND

This application relates to optical communication ring networks.

Optical ring networks can be built using a single optical fiber ring path to optically link optical communication nodes. Either uni-directional or bi-directional optical communication traffic can be provided in such single-fiber optical ring networks. Various optical wavelength division multiplexing (WDM) techniques can be used to increase the number optical wavelengths in a single fiber to increase the optical communication capacity, such as dense WDM (DWDM) networks. Optical ring networks can have various applications, including the access part of a network or the backbone of a network such as interconnecting central offices. Optical ring networks can be implemented to provide a protection switch as a "self-healing" mechanism to maintain continuous operation when an optical break occurs in the optical ring and can also allow for relative ease in adding and deleting nodes on the optical ring. WDM or DWDM optical ring networks can be implemented with all optical add/drop nodes on the ring without expensive O-E-O regenerator so that nodes are connected directly by multiple WDM or DWDM wavelengths to offer increased capacity, reduced timing jitter, and improved signal latency and to allow for scalability, at a reduced cost. The cost of optical fiber deployment in a ring topology can be less than that in a mesh topology. Due to these and other features of optical ring networks, optical ring networks have been widely deployed in metro and regional local area networks (LANs) for both data communication systems such as a token-ring LAN and Fiber Distributed Data Interface (FDDI) LAN) and telecom systems such as SONET/SDH optical networks.

SUMMARY

This application describes, among others, systems, apparatus and methods for implementing single-fiber optical ring networks based double side band modulation. In one implementation, an optical communication system can include an optical ring which includes optical nodes and a single fiber optically coupled between two adjacent optical nodes to connect the optical nodes into the optical ring. The optical ring is configured to support optical wavelength-division-multiplexed (WDM) signals at different optical WDM wavelengths which are divided into pairs of WDM signals with each pair carrying a common signal channel and propagating in opposite directions in the optical ring.

In this particular implementation, each optical node includes first and second, separate optical paths that join each other at two ends of the first and second optical paths, respectively, to connect to a first single fiber at one side of the optical node and to a second single fiber at the other side of the optical node. The first optical path is configured to carry a first WDM signal of each pair at a first optical WDM frequency along a first direction in the optical ring and the second optical path is configured to carry a second WDM signal of the pair at a second, different optical WDM frequency along a second, opposite direction. Each optical node also includes an optical transmitter operable to produce an optical carrier beam at an optical carrier frequency and to modulate the optical carrier beam in response to at least one modulation signal at a modulation frequency carrying a signal channel as a baseband signal to produce a modulated optical beam carrying, at least, a first optical add signal at the first optical WDM frequency greater than the optical carrier frequency by the modulation frequency and a second optical add signal at the second optical WDM frequency less than the optical carrier frequency by the modulation frequency while energy at the optical carrier frequency is suppressed. Each optical node further includes a first optical WDM add unit coupled to the first optical path to add the first optical add signal to the first optical path in the first direction; a first optical WDM drop unit coupled to the first optical path, upstream from the first optical WDM add unit along the first direction, to couple light at the first optical WDM frequency out of the first optical path as a first optical drop signal; a second optical WDM add unit coupled to the second optical path to add the second optical add signal to the second optical path in the second direction; a second optical WDM drop unit coupled to the second optical path, upstream from the second optical WDM add unit along the second direction, to couple light at the second optical WDM frequency out of the second optical path as a second optical drop signal; an optical detector to receive and detect the first optical drop signal or the second optical drop signal; and an optical switch coupled to receive the first optical drop signal or the second optical drop signal from the first and second optical WDM drop units and operable to direct the first optical drop signal to the optical detector when both first and second optical drop signals are present at a respective optical node, and to switch to the second optical drop signal to the optical detector when the first optical drop signal becomes absent.

In another implementation, an optical communication system includes an optical ring comprising optical nodes and a single fiber optically coupled between two adjacent optical nodes to connect the plurality of optical nodes into the optical ring. The optical ring launches a signal channel as a first optical signal at a first optical wavelength-division-multiplexed (WDM) frequency along a first direction in the optical ring and a second optical signal at a second, different optical WDM frequency along a second, opposite direction and launches different signal channels at different first WDM frequencies and different second WDM frequencies, respectively. Each optical node includes a first node terminal to connect to the optical ring at a first side of the optical node; a second node terminal to connect to the optical ring at a second, opposite side of the optical node; a first optical path within the optical node to carry light along the first direction from the first node terminal to the second node terminal; a second, separate optical path with the optical node to carry light along the second direction from the second node terminal to the first node terminal; an optical transmitter to produce an optical carrier beam at an optical carrier frequency and to modulate the optical carrier beam in response to at least one modulation signal at a modulation frequency carrying a signal channel as a baseband signal to produce a modulated optical beam carrying a first modulated optical carrier at the first optical WDM frequency greater than the optical carrier frequency by the modulation frequency and a second modulated optical carrier at the second optical WDM frequency less than the optical carrier frequency by the modulation frequency while energy at the optical carrier frequency is suppressed; an optical splitter to split the modulated optical beam from the optical transmitter into a first optical add signal and a second optical add signal; a first optical WDM add unit to couple the first optical add signal to the first optical path and select light at the first optical WDM frequency to propagate along the first direction while blocking light at the second optical WDM frequency from propagating in the first optical path and transmitting light at frequencies different from the second optical WDM frequency; a second optical WDM add unit to couple the second optical add signal to the second optical path and select light at the second optical WDM frequency to propagate along the second direction while blocking light at the first optical WDM frequency from propagating in the second optical path and transmitting light at frequencies different from the first optical WDM frequency; a first optical WDM terminal unit coupled at the first node terminal to connect the first and second optical paths to the optical ring to transmit light at the first optical WDM frequency in the first optical path into optical ring along the first direction, and to transmit light at the second optical WDM wavelength from the optical ring into the second optical path along the second direction; and a second optical WDM terminal unit coupled at the second node terminal to connect the first and second optical paths to the optical ring to transmit light at the second optical WDM frequency in the second optical path into optical ring along the second direction, and to transmit light at the first optical WDM wavelength from the optical ring into the first optical path along the first direction.

In yet another implementation, a method for communications in an optical communication system is provided. This system includes optical nodes and a single fiber optically coupled between two adjacent optical nodes to connect the optical nodes into an optical ring. The method includes launching into the optical ring a signal channel as a first optical signal at a first optical wavelength-division-multiplexed (WDM) frequency along a first direction in the optical ring and a second optical signal at a second, different optical WDM frequency along a second, opposite direction; launching different signal channels in different first optical signals at different first WDM frequencies and different second optical signals at different second WDM frequencies, respectively; in launching a signal channel into the optical ring from an optical node, applying an optical double sideband modulation in modulating an optical carrier beam at an optical carrier frequency to modulate the optical carrier beam in response to at least one modulating signal at a modulation frequency carrying a signal channel as a baseband signal to produce a modulated optical beam carrying a first modulated optical carrier at the first optical WDM frequency greater than the optical carrier frequency by the modulation frequency and a second modulated optical carrier at the second optical WDM frequency less than the optical carrier frequency by the modulation frequency while energy at the optical carrier frequency is suppressed; splitting the modulated optical beam into a first optical add signal and a second optical add signal; selecting light at the first optical WDM frequency in the first optical add signal to propagate along the first direction into the optical ring as the first optical signal carrying the baseband signal while blocking light at the second optical WDM frequency from propagating along the first direction in the optical ring; and selecting light at the second optical WDM frequency in the second optical add signal to propagate along the second direction into the optical ring as the second optical signal carrying the baseband signal while blocking light at the first optical WDM frequency from propagating along the second direction in the optical ring.

The systems, apparatus and techniques described in this application may be implemented to achieve one or more advantages. For example, the double sideband modulation can be used to produce multiple optical WDM wavelengths from one carrier beam from one optical transmitter. Therefore, the number of optical transmitters can be reduced. The double sideband modulation can also be implemented in a way to reduce the spacing between the two adjacent sidebands produced by the modulation and thus increase the number of optical WDM channels within a given optical spectral band.

These and other implementations, examples and variations are described in greater detail in the attached drawings, the detailed description and the claims.

DETAILED DESCRIPTION

Optical ring networks can use two counter propagating optical signals to carry the same channel to improve the reliability of the networks. When such a network experiences an optical failure at a location that cut off an optical channel to one or more nodes, the counter-propagating optical signal carrying the same channel can be used to deliver the channel to the affected node or nodes. In a ring network with two fibers connecting two adjacent nodes, the two counter-propagating optical signals carrying the same channel can be at the same optical WDM wavelength without interference to each other by launching one optical signal in one fiber and the other optical signal in the other fiber. A single optical transmitter can be used to supply a WDM wavelength that is split into the two counter propagating optical signals in the two fibers, respectively, for carrying the same channel. This design is a dual-fiber unidirectional-path-switching-ring (O-UPSR) configuration and provides redundancy for each channel to improve the reliability of the network. When an optical failure cuts off light propagation in one direction in either one or both of the two fibers, the counter-propagating optical signal allows continuous data communication.

In a single-fiber ring network, the same fiber is used to carry the counter-propagating optical signals carrying the same channel and thus the optical WDM wavelengths of these two counter-propagating optical signals are usually different in order to separate these two counter-propagating optical signals and to avoid optical interference such as in-band cross-talks caused by Rayleigh or optical back-reflections at an optical discontinuity point (e.g., a fiber cut). This requirement of using two WDM wavelengths for the counter propagating optical signals carrying the same channel in a single-fiber ring usually demands twice the number of optical WDM wavelengths in a dual-fiber ring network to achieve the same network capacity. In addition, in order to produce the two counter propagating optical signals at two different optical WDM wavelengths for carrying the same channel, two different optical transmitters or lasers may be required. Because optical transmitters are expensive, using two optical transmitters for producing optical signals carrying the same channel in single-fiber ring networks increases the overall cost of networks.

The systems, apparatus and methods for constructing and operating single-fiber ring networks in this application can be implemented to address the issues of the network capacity within a given spectral band and the number of optical transmitters needed in a single-fiber ring network. In the examples described below, optical double sideband modulation can be used to modulate a single optical carrier beam at an optical carrier wavelength to produce two or more different optical sidebands at different optical WDM wavelengths. Two different optical sidebands can be used to carry one channel and be launched as counter propagating signals in the single fiber ring. This use of the double sideband modulation can be used to produce multiple optical WDM wavelengths from one carrier beam from one optical transmitter. Therefore, the number of optical transmitters needed in the single-fiber ring network can be reduced. The double sideband modulation can also be implemented in a way to reduce the spacing between the two adjacent sidebands produced by the modulation and thus increase the number of optical WDM channels within a given optical spectral band. Specific optical node designs are provided in the described examples to configure single-fiber ring networks in a unidirectional-path-switching-ring (O-UPSR) configuration.

Figures 1A, 1B, 1C:
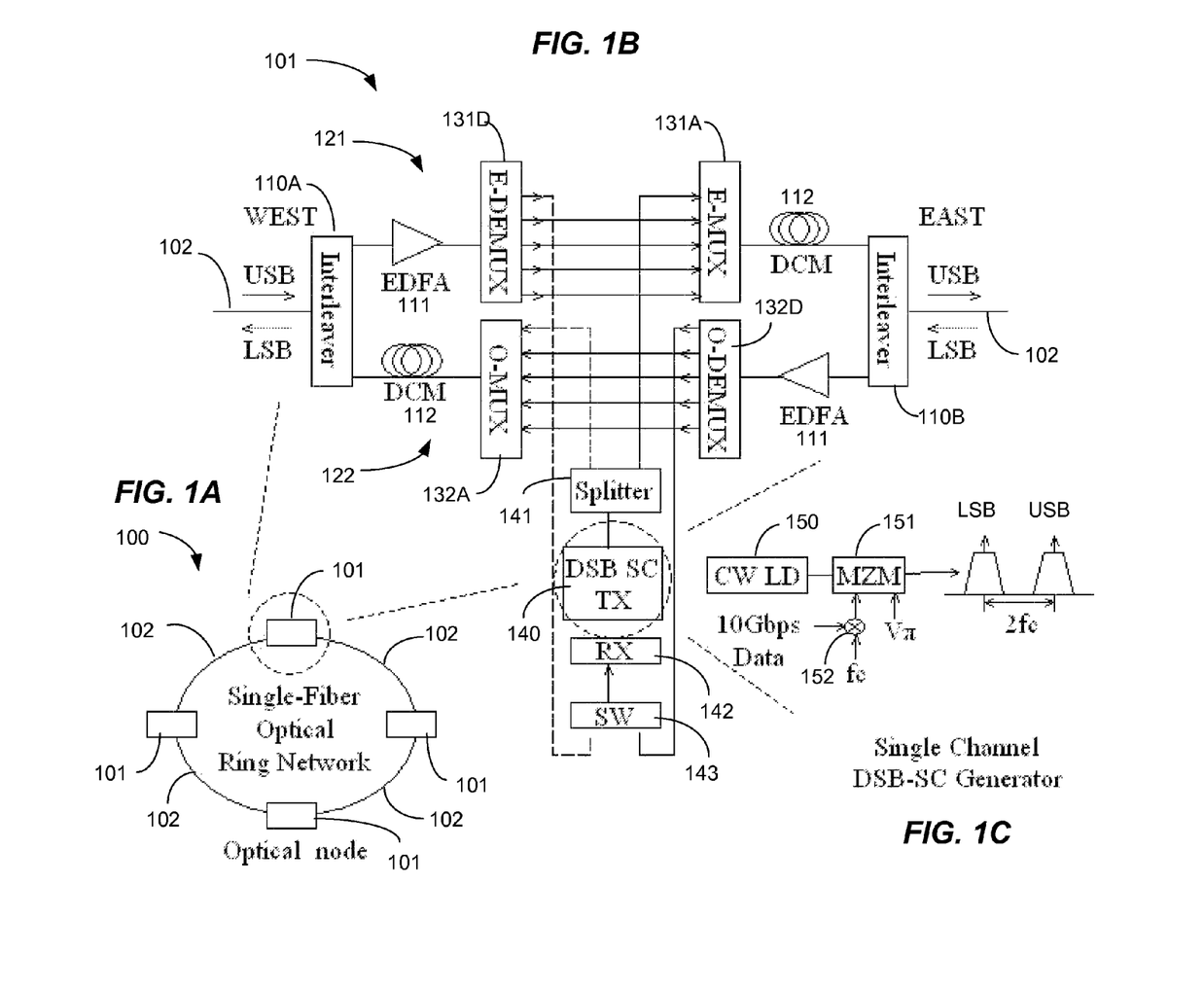
FIGS. 1A and 1B show an example of a single-fiber ring network and an example of an optical node.
FIG. 1C shows one example of the optical transmitter in FIG. 1 based on double sideband modulation with suppressed carrier.

FIGS. 1A and 1B illustrate one example 100 of a single-fiber O-UPSR network system. In FIG. 1A, optical communication nodes 101 are connected to form the single-fiber ring network 100 where a single fiber 102 connects two adjacent nodes 101. Each signal channel is modulated onto and carried by two counter propagating optical signals at two different optical WDM wavelengths in the single-fiber optical ring 100. Hence, this single-fiber optical ring 100 launches a signal channel as a first optical signal at a first optical WDM frequency or wavelength along a first direction in the optical ring network and a second optical signal at a second, different optical WDM frequency or wavelength along a second, opposite direction and launches different signal channels at different first WDM frequencies and different second WDM frequencies, respectively.

FIG. 1B shows one exemplary implementation of the optical node 101. The optical node 101 includes a first node terminal 110A to connect to the optical ring at a first side of the optical node 101 and a second node terminal 110B to connect to the optical ring at a second side of the optical node 101. Although there is only a single fiber optical path 102 between two adjacent optical nodes 101, there are two separate optical paths 121 and 122 within the optical node 101. The first optical path 121 is used to carry light along the first direction from the first node terminal 110A to the second node terminal 110B. The second optical path 122 is used to carry light along the second direction from the second node terminal 110B to the first node terminal 110A.

The optical node 101 includes an optical transmitter 140 which produces an optical carrier beam at an optical carrier frequency. The optical transmitter 140 modulates the optical carrier beam in response to at least one modulating signal at a modulation frequency carrying a signal channel as a baseband signal to produce a modulated optical beam. This modulated optical beam carries, at least, a first modulated optical carrier (i.e., a modulation sideband) at the first optical WDM frequency greater than the optical carrier frequency by the modulation frequency and a second modulated optical carrier (i.e., another modulation sideband) at the second optical WDM frequency less than the optical carrier frequency by the modulation frequency while energy at the optical carrier frequency is suppressed. This modulation is double sideband modulation (DSB) because the two modulation sidebands are on two opposite sides of the carrier frequency and with suppressed optical carrier (SC). Additional pairs of modulated optical sidebands of the optical carrier at different optical WDM frequencies may be present, e.g., second-order sidebands that are spaced from the optical carrier by twice of the modulation frequency. The optical node 101 includes an optical splitter 141 to split the modulated optical beam from the optical transmitter 140 into a first optical add signal in one direction of the ring 100 and a second optical add signal in the opposite direction of the ring 100. The optical node 101 includes a first optical WDM add unit 131A to couple the first optical add signal to the first optical path 121 and to select light at the first optical WDM frequency to propagate along the first direction while blocking light at the second optical WDM frequency from propagating in the first optical path 121. Similarly, a second optical WDM add unit is included to couple the second optical add signal to the second optical path 122 and select light at the second optical WDM frequency to propagate along the second direction while blocking light at the first optical WDM frequency from propagating in the second optical path 122.

In addition, the first node terminal 110A includes a first optical WDM terminal unit to connect the first, second optical paths 121 and 122 to the optical ring to transmit light at the first optical WDM frequency in the first optical path 121 into optical ring along the first direction, and to transmit light at the second optical WDM wavelength from the optical ring into the second optical path 122 along the second direction. Similarly, the second optical WDM terminal 110B includes a second node terminal unit to connect the first, second optical paths 121 and 122 to the optical ring to transmit light at the second optical WDM frequency in the second optical path 122 into optical ring along the second direction, and to transmit light at the first optical WDM wavelength from the optical ring into the first optical path 121 along the first direction. Here, the single optical transmitter 140 produces the first and second add signals with the same channel signal but at two different optical WDM frequencies.

In one implementation, the first optical WDM add unit 131A can be an even-numbered channel WDM multiplexer to pass and combine even numbered optical WDM channels (including, e.g., the first optical WDM frequency) while rejecting odd numbered optical WDM channels (including, e.g., the second optical WDM frequency). The second optical WDM add unit 132A can be an odd-numbered channel WDM multiplexer to pass and combine odd numbered optical WDM channels (including, e.g., the second optical WDM frequency while rejecting even numbered optical WDM channels (including, e.g., the first optical WDM frequency). The first and second terminal units 110A and 110B can be WDM interleavers where the WDM interleaver 110A directs the even numbered optical WDM channels from the optical ring to pass to the first optical path 121 and directs the odd numbered optical WDM channels received in the second optical path 122 to pass to the optical ring, and the WDM interleaver 110B directs the odd numbered optical WDM channels from the optical ring to pass to the second optical path 122 and directs the even numbered optical WDM channels received in the first optical path 121 to pass to the optical ring.

The optical node 101 can further include optical drop units to selectively drop an optical WDM channel and the wavelength of the dropped optical WDM channel can be used by the same optical node to add a channel. As illustrated in FIG. 1B, the optical node 101 can include a first optical drop unit 131D coupled in the first optical path 121 between the first optical WDM terminal unit 110A and the first optical add unit 131A to drop light at the first optical WDM frequency as a first optical drop signal, and a second optical drop unit 132D coupled in the second optical path between the second optical WDM terminal unit 110B and the second optical add unit 132A to drop light at the second optical WDM frequency as a second optical drop signal. An optical detector 142 (Rx) is provided to receive either one of the first and the second optical drop signals. An optical switch 143 is coupled between the optical detector 142 and the first, second optical drop units 131D and 132D to receive the first or the second optical drop signals and is operable to select one of the first and the second optical drop signals to be received by the optical detector 142.

Under the normal operation, both drop signals are present at the optical switch 143 and the optical switch 143 directs a default drop signal selected from one of the two dropped signals to the optical detector 142 for detection. When a failure occurs and causes the default drop signal to disappear at an optical node 101, the switch 143 in this affected optical node responds to the loss of the default drop signal and toggles or switches to direct the other drop signal to the optical detector 142 in lieu of the default drop signal. After the failure is corrected and the default drop signal is once again received by the optical switch 143, the optical switch 143 returns to its normal mode to switches the default drop signal to the optical detect 142.

In one implementation, the first optical WDM drop unit 131D can be an even-numbered channel WDM demultiplexer to separate the even numbered optical WDM channels (including, e.g., the first optical WDM frequency) into separate optical paths and a selected dropped optical WDM channel is directed to the optical switch 143. Similarly, the second optical WDM drop unit 131D can be an odd-numbered channel WDM multiplexer to pass and combine odd numbered optical WDM channels (including, e.g., the second optical WDM frequency while rejecting even numbered optical WDM channels (including, e.g., the first optical WDM frequency). The first and second terminal units 110A and 110B can be WDM interleavers where the WDM interleaver 110A directs the even numbered optical WDM channels from the optical ring to pass to the first optical path 121 and directs the odd numbered optical WDM channels received in the second optical path 122 to pass to the optical ring, and the WDM interleaver 110B directs the odd numbered optical WDM channels from the optical ring to pass to the second optical path 122 and directs the even numbered optical WDM channels received in the first optical path 121 to pass to the optical ring.

The node 101 may include other components such as optical amplifiers and dispersion compensation devices. The example in FIG. 1B shows that an Er-doped fiber amplifier (EFDA) 112 can be placed in the upstream of each optical path 121 or 122 to amplify the received optical WDM channels and a dispersion-compensating module (DCM) 112 in the downstream of each optical path 121 or 122 to reduce the dispersion of the optical WDM channels to the ring.

The above use of the WDM interleavers 110A, 110B, even and odd numbered WDM multiplexers 131A, 132A and even and odd numbered WDM demultiplexers 131D and 132D in the example optical node 101 in FIG. 1B provides a bi-directional optical add-drop multiplexer (BD-OADM) in each of the two optical paths 121 and 122. The BD-OADM in the optical path 122 is composed of a pair of back-to-back odd-ITU-channel multiplexer (O-MUX) 132A and demultiplexer (O-DEMUX) 132D and the signal adding and dropping functions are achieved in the second optical path 122 between the units 132A and 132D. The BD-OADM in the first optical path 121 is composed of a pair of back-to-back even-ITU-channel E-MUX 131A and E-DEMUX 131D and the adding and dropping are achieved in the first optical path 121 between the units 131A and 131D. This design allows two different optical subcarriers or modulation sidebands generated on opposite sides of the optical carrier from an optical transmitter TX using DSB modulation to be used as two different optical signals at two different WDM wavelengths—added by an optical node 101 in two opposite directions in the single-fiber ring 100. For example, the lower sideband (LSB) subcarrier modulated to carry a channel as a baseband signal can be added to the single-fiber ring 100 in the counter-clock wise direction marked as "West" in FIG. 1B while the upper sideband (USB) subcarrier modulated to carry the same baseband signal can be added to the single-fiber ring 100 in the clock wise direction marked as "East" in FIG. 1B.

Under this design, the USB signals are directed to propagate along the clock-wise direction (east-bound) via E-MUX 131A and E-DEMUX 131D, while LSB signals are directed to propagate along the counter-clock wise direction (west-bound) via O-MUX 132A and O-DEMUX 132D. The optical frequencies of the USB and LSB signals are selected to fit into the even and odd ITU-grids of the interleavers 110A and 110B, respectively and thus the optical wavelength interleavers 110A and 110B in each node 101 enable bi-directional transmission of the USB and LSB signals. Therefore, each optical node 101 is designated to drop or add at a designated WDM channel wavelength for that particular optical node 101 along one propagation direction in the ring 100 and different optical nodes 101 are configured to add or drop at different WDM wavelengths in each propagation direction. Optical signals at optical WDM wavelengths different from the particular WDM wavelength that is dropped at a particular node 101 can pass through the node 101. As a result, optical WDM channels can be dropped, added, and passed through in each optical node 101.

FIG. 1C illustrates one example implementation of the optical transmitter 140 based on DSB modulation of a continuous wave (CW) laser beam. In this example, the optical transmitter 140 includes a CW laser diode (CWLD) 150 to produce a CW laser beam at an optical carrier frequency and a Mach-Zehnder optical modulator (MZM) 151 is used to perform the DSB modulation on the CW laser beam to produce LSB and USB DSB subcarrier baseband signals on opposite sides of the optical carrier frequency while suppressing the optical carrier frequency. An electronic signal mixer 152 is used to mix the baseband signal (e.g., a 10-Gbps data signal) with a microwave or radio frequency carrier signal at fc to produce a modulation control signal for controlling the optical modulation of the modulator 151. Under proper DSB modulation, the optical output of the optical modulator 151 includes a LSB DSB subcarrier baseband signal centered at a DSB subcarrier frequency that is less than the optical carrier frequency of the CW laser beam by fc and a USB DSB subcarrier baseband signal centered at a DSB subcarrier frequency that is greater than the optical carrier frequency of the CW laser beam by fc. Notably, the energy at the optical carrier frequency is suppressed by the DSB modulation to a level much less than the LSB and USB signals. For example, the Mach-Zehnder modulator can be biased at a voltage level to minimize the optical carrier power as described in P. D. Sargis, B. Henderer, and M. E. Lowry, "10-Gb/s subcarrier multiplexed transmission over 490 km of ordinary single-mode fiber without dispersion compensation," IEEE Photon. Technol. Lett., vol. 9, pp. 1658-1660, December 1997.

Figure 2A:
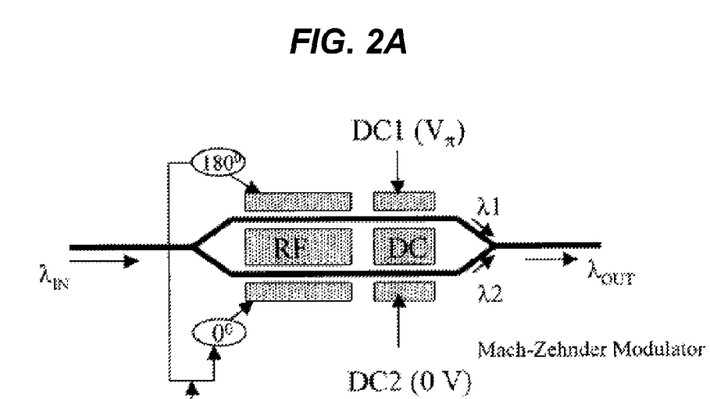
FIGS. 2A and 2B show another example of the optical transmitter in FIG. 1 based on double sideband modulation with suppressed carrier.

FIG. 2A shows an example of DSB modulation in the optical modulator 151 with RF electrodes to apply phase shifted modulation control signals and DC bias electrodes to bias the modulator 151. The optical modulator 151 has two optical paths labeled as λ1 and λ2, respectively. The CW laser beam from the laser 150 is represented by λIN and is split into two optical beams along the two optical paths λ1 and λ2, respectively. A baseband channel signal is modulated onto the two optical signals in the two paths at a modulation frequency fc where the phase of the one optical path (e.g., the upper path λ1) is shifted from the phase of the other optical path (e.g., the lower path λ2) by 180 degrees. The phase modulation in each optical path produces double sidebands on opposite sides of the optical carrier frequency.

Figure 2B:
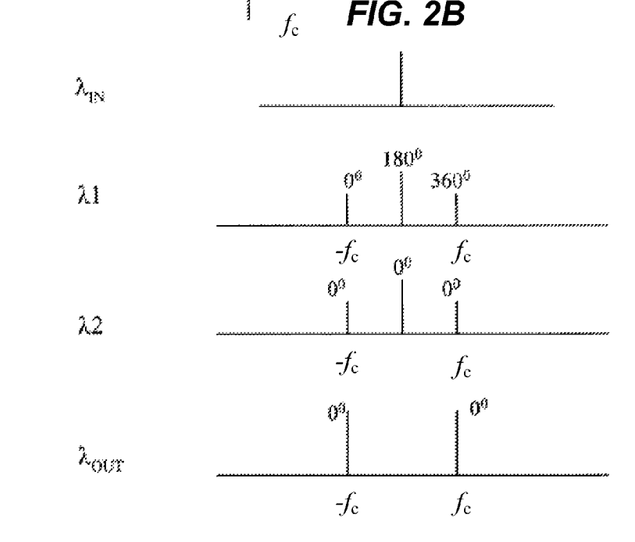

FIG. 2B shows the frequency components in each optical signal in the optical modulator 151 under the DSB modulation in FIG. 2A. The modulation is applied to the upper and lower electrodes with a phase difference of 180 degrees. As a result, the phase modulation in the upper optical path has the USB band with a phase shift of 360 degrees, the carrier with a phase shift of 180 degrees and the LSB with a phase shift of 0 degrees. The phase modulation in the lower optical path has the USB band with a phase shift of 0 degrees, the carrier with a phase shift of 0 degrees and the LSB with a phase shift of 0 degrees. Therefore, when the phase modulated signals output from the two optical paths are combined to produce the output (λOUT) of the optical modulator 151, the carriers from the two optical paths substantially cancel each other due to the relative phase shift of 180 degrees. The USB and LSB sidebands are added in phase to produce the output LSB and USB sidebands carrying the same baseband signal.

Figure 3A:
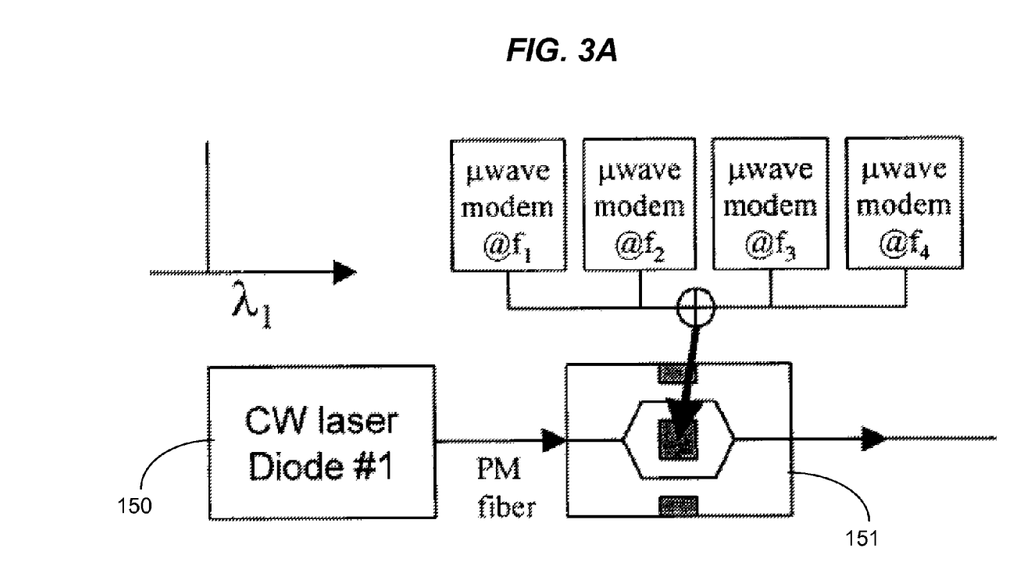
FIGS. 3A and 3B show another example of the optical transmitter in FIG. 1 based on double sideband modulation with suppressed carrier.
Figure 3B:
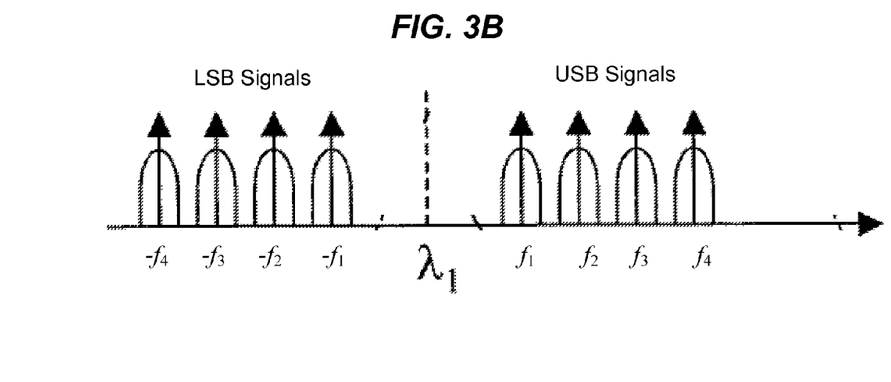

FIGS. 3A and 3B illustrate that the optical modulator 151 can be applied with two or more microwave or RF baseband signals at different microwave or RF carrier frequencies to produce two or more pair of USB and LSB bands shown in FIGS. 2A and 2B. In this example, four baseband signals at four microwave carrier frequencies f1, f2, f3 and f4 are applied through four different microwave modem units to the optical modulator 151 perform the DSB modulation on a CW laser beam at an optical carrier wavelength λ1. As shown in FIG. 3B, the signal at the optical carrier wavelength λ1 is suppressed in comparison of the signal strengths of the four pairs of USB and LSB bands carrying respective baseband signals.

Figure 4:
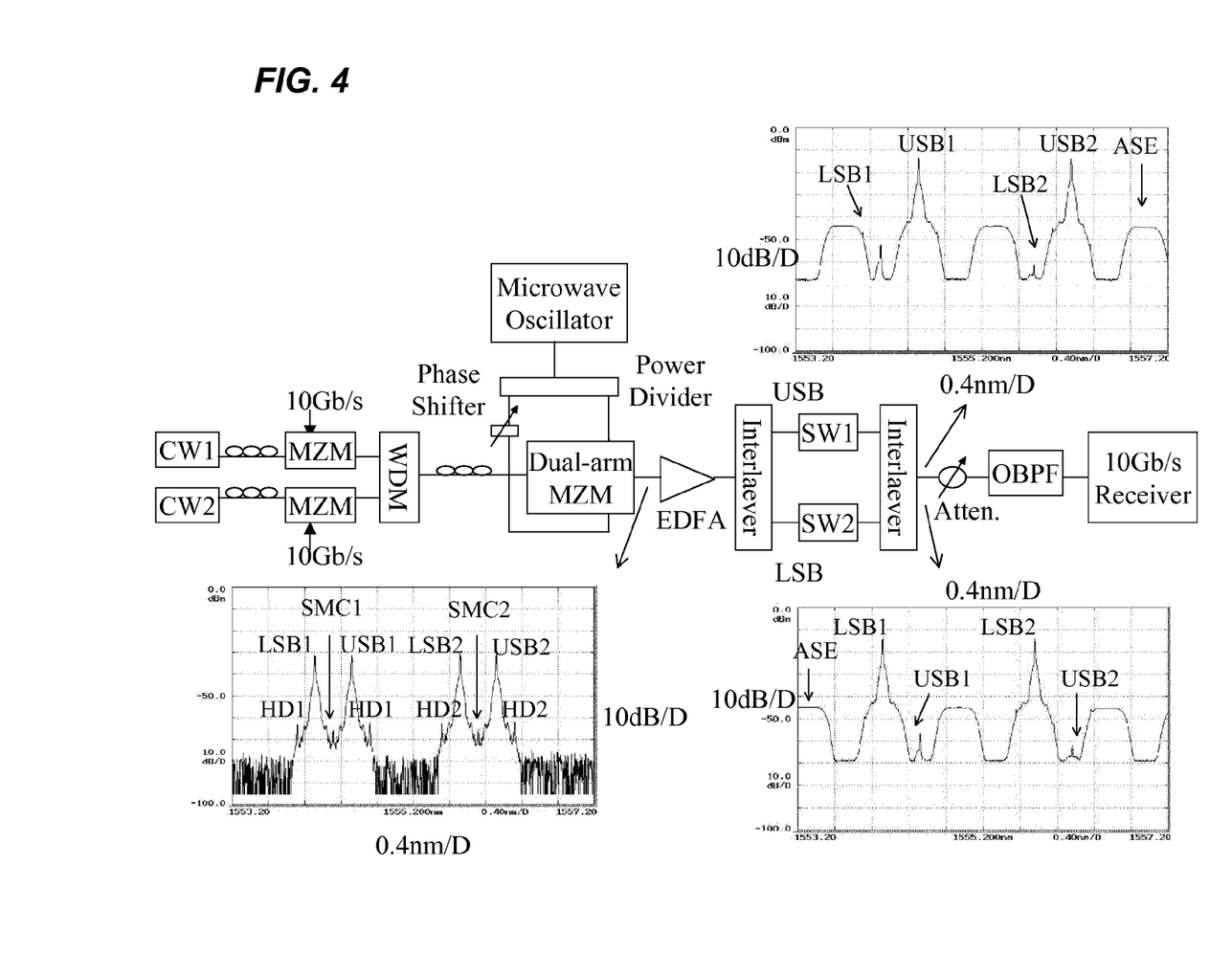
FIG. 4 shows a test system for simulating the system in FIGS. 1A and 1B, wherein the resolution bandwidth of the measured optical spectra is 0.01 nm. SMC: suppressed modulated optical carrier, HD1 and HD2: 2nd harmonic distortion.
Figure 5:
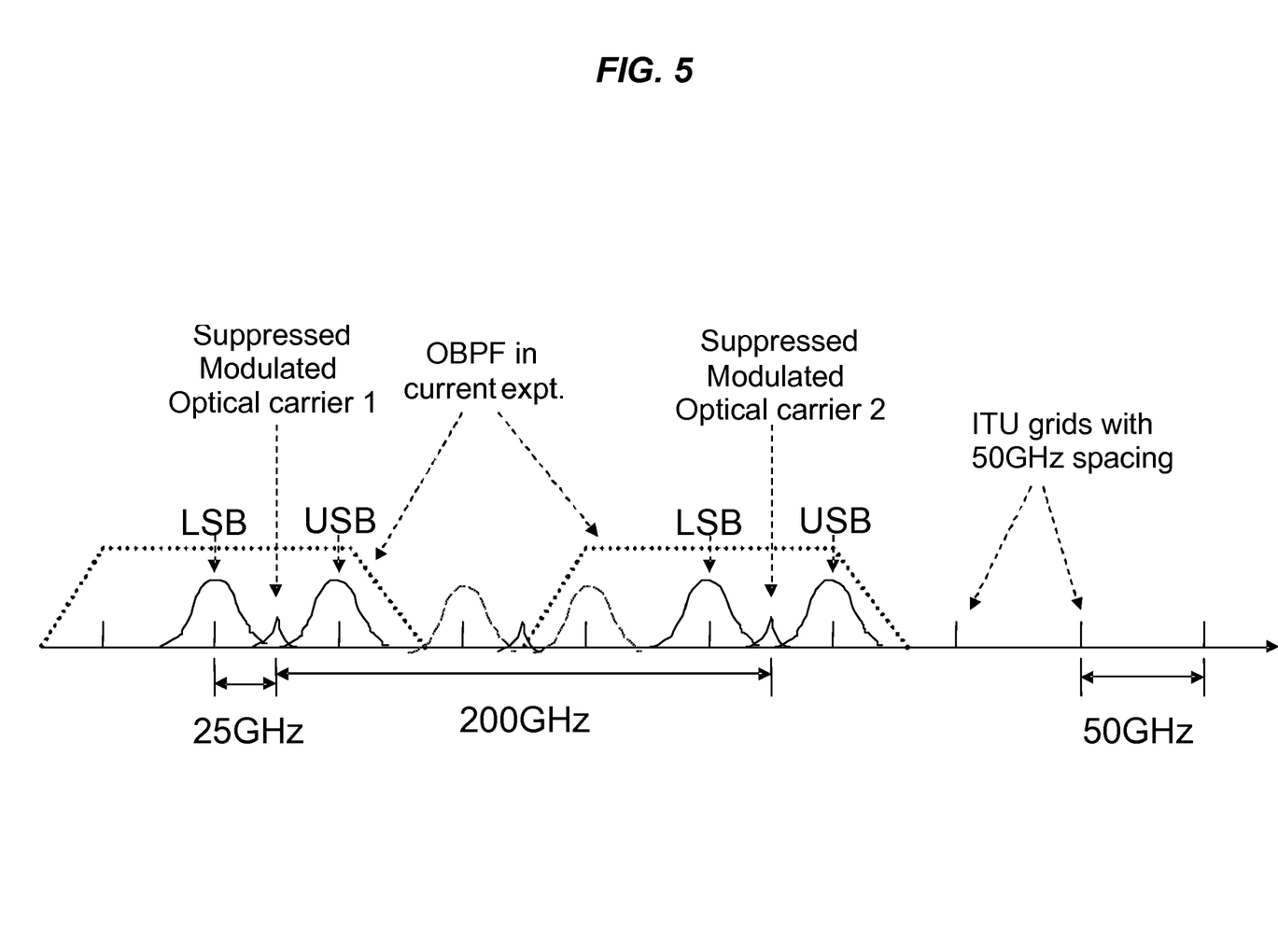
FIG. 5 shows the relative frequency arrangement of the two externally modulated lasers and their respective double-sideband signals. Note that the OBPF in an ideal case should be narrow enough to filter just one USB or LSB signal
Figure 6:
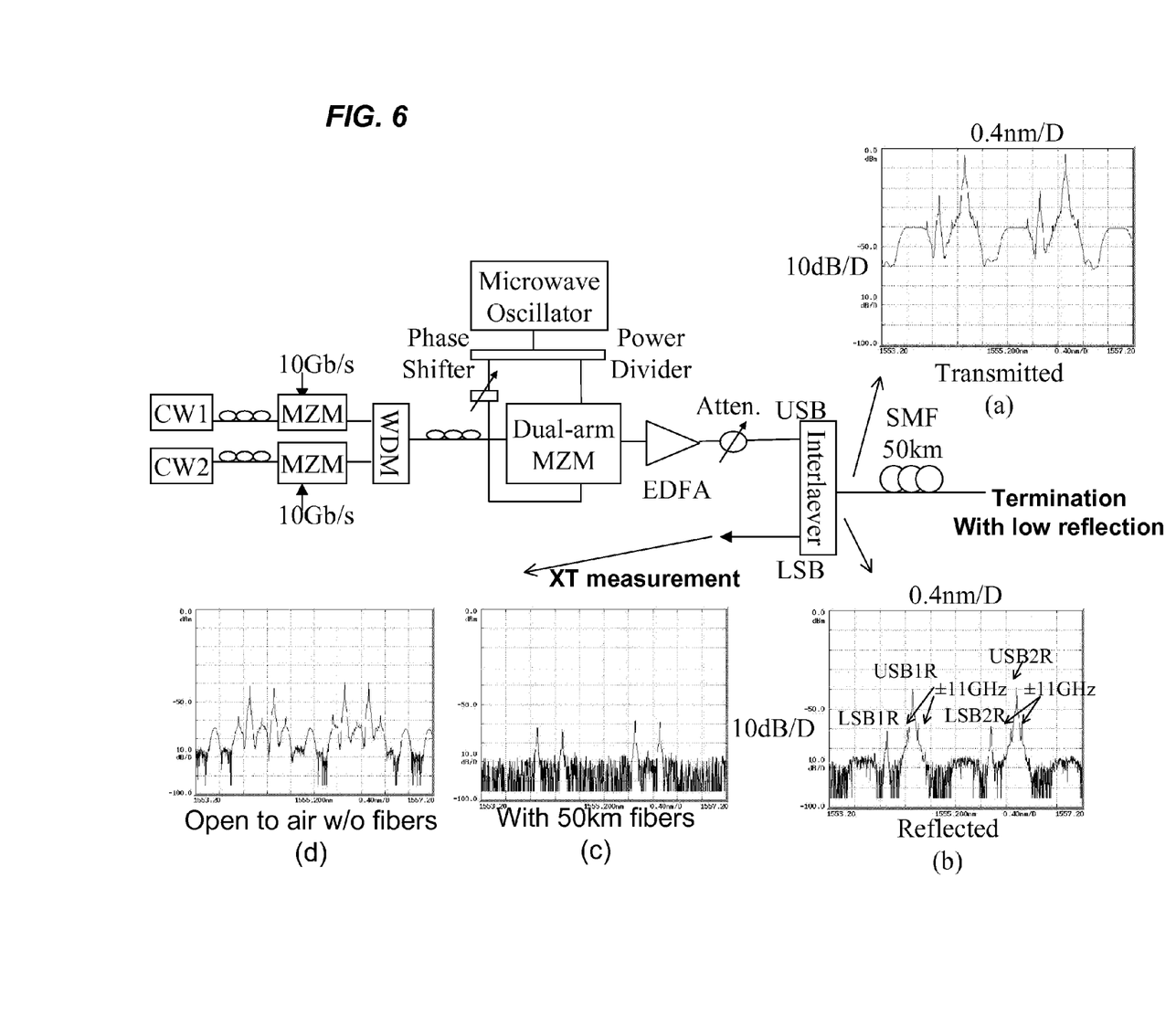
FIG. 6 shows an experimental setup to investigate the impact of back-reflections: (a) the transmitted spectrum, (b) the reflected spectrum from 50 km fibers, the additional "R" in USB1R, SMC1R, etc., stands for Rayleigh backscattered signals, (c) the reflected spectrum after the interleaver through 50 km SMF, and (d) the reflected spectrum after the interleaver with an air interface.

The following sections and FIGS. 4 through 6 describe a testing system and measurements obtained form the testing system to demonstrate the feasibility and operation of the single-fiber ring network shown in FIG. 1. The tests conducted with the testing system doubled the transmission capacity in a single-fiber O-UPSR system without doubling the optical transmitters or optical transceivers needed in the system. Optical double sideband modulation with suppressed carrier (DSB-SC) was used in the tests to automatically duplicate the modulating signal in two wavelengths (on "odd" and "even" ITU grids) which are spaced twice denser than that used for a some known two-fiber O-UPSR networks such as the ring networks described in Telcordia GR-1400 entitled "SONET dual-fed unidirectional path switched ring (UPSR) equipment generic criteria" and released in July 2006.

FIG. 4 shows the testing system that was used to simulate the operation of the system in FIG. 1. Two continuous-wave lasers CW1 and CW2 operating at two laser wavelengths with a frequency spacing of 200 GHz were used to produce the optical signals to be tested. The center frequencies of the two lasers CW1 and CW2 were shifted in frequency by 25 GHz away from a typical 50 GHz ITU grid so that their USBs and LSBs can coincide with the 50-GHz ITU grid for WDM wavelengths when the modulation frequency fc is chosen to be 25 GHz as shown in FIG. 5. The wavelengths of the two lasers CW1 and CW2 after the 25 GHz offsetting were 1554.33 and 1555.95 nm, respectively. Both lasers were respectively externally modulated by a 10 Gb/s NRZ signal using a single-electrode LiNbO3 Mach-Zehnder modulator. The modulated signals were then combined via a WDM unit and sent to a dual-drive LiNbO3 Mach-Zehnder modulator where the DSB-SC modulation was performed. In this particular example, the suppressed carrier in the DSB-SC modulation is actually a suppressed modulated carrier. To achieve DSB-SC modulation at both wavelengths in the combined optical signal from the WDM unit, the dual-drive modulator was modulated by a 17 dBm microwave oscillator at 25 GHz and biased at its minimum optical power point. The half-wave DC voltage $V_\pi$ of the push-pull modulator was 4.5 V. To minimize the modulated optical carrier and the microwave harmonic distortion (HD), the microwave driving power and the delay between the microwave driving signals at the two electrodes of the modulator were carefully tuned. The testing system in FIG. 4 used only one microwave module to produce one a pair of USB and LSB signals for each carrier. Two or more microwave modules can be used in applications which need additional DSB-SC wavelengths. In FIG. 4, two 50/100 GHz WDM interleavers were used to simulate the two interleavers 110A and 110B in FIG. 1. No MUX or DEMUX was used in test because this does not affect the experimental result. Each 50/100 GHz WDM interleaver has a 0.5 dB bandwidth of 35 GHz, and suppresses adjacent channel by more than 15 dB. Two optical switches SW1 and SW2 were used to select either LSB or USB to pass through the interleavers. The first WDM interleaver was used to separate the USB and LSB signals so that the USB signals were directed to the upper optical path with the optical switch SW1 and the LSB signals were directed to the lower optical path with the optical switch SW2. The second WDM interleaver was used to interleave the signals received from the two optical paths with switches SW1 and SW2 to produce an optical output. In some measurements, an optical bandpass filter (OBPF) was used at the output of the second WDM interleaver to filter the light and a 10-Gb/soptical receiver was used to detect the filtered light from the OBPF. In operating the optical modulator for the DSB modulation, the microwave driving power should be controlled in order to maximize optical carrier suppression and minimize 2nd harmonics.

The measured optical spectrum at the output of the dual-drive MZM modulator showed that the suppression of the modulated optical carrier and the 2nd harmonic distortion were both more than 30 dB. Measured optical spectra at the output of the second interleaver showed that the adjacent USB or LSB channel suppression was more than 35 dB due to the cascaded interleaver/de-interleaver pair. The upper and lower spectra showed predominantly the USB's and LSB's when optical switch SW1 or SW2 was on, respectively. The adjacent channel crosstalk was 10-15 dB lower than the measured optical power of the amplified spontaneous emission (ASE) and thus should cause negligible system penalty.

The effect of the Rayleigh back-scattering was also examined in the tests, and the results are shown in FIG. 6. The optical spectrum shown in the inset (a) is the transmitted USB's with a launched power per channel of 0 dBm. Note that the LSB's were not suppressed as deep as that shown in FIG. 4 because the DSB-SC signal passed through only one interleaver. The optical spectrum in the inset (b) is the reflected USB/LSB's after 50 km of conventional single-mode fiber transmission. In this spectrum, the Rayleigh backscattering (RB) signals and spontaneous Brillouin scattering (SpBS)-induced shifted frequencies (shifted by ±11 GHz) were observed. The measured Rayleigh reflection is −35.3 dB. After the interleaver, the USB's were suppressed another 19~24 dB, while the LSB's power stayed essentially the same, as shown in FIG. 6(c). If the LSB suppression is added due to the transmitting-end E-MUX (~15 dB), the received RB-reflected LSB power level can be as low as −75 dBm, which is 15 dB lower than what is shown in FIG. 6(c). When there is a fiber-cut-induced air-interface back reflection, the reflected LSB is about 20 dB higher than that in RB signal, as shown in FIG. 6(d), i.e., with a power level around −55 dBm. In both cases, the reflected LSB power should be significantly below a normally received westbound LSB signal (−20~−25 dBm).

The test system in FIG. 4 was used to measure the BER performance and obtained a less than 1 dB system power penalty at a BER of $10^{-9}$, for both the LSB and USB signals at both 1555.95 nm and 1554.33 nm. These results were obtained using an optical band pass filter (OBPF) with a 1-dB bandwidth of about 100 GHz as shown in FIG. 5, and a commercial 10 Gb/s PIN receiver as the optical detector.

The tests conducted by using the system in FIG. 4 demonstrate that a single-fiber O-UPSR network based on FIG. 1 can be used to achieve operations of an equivalent dual-fiber O-UPSR network without doubling the number of required optical transmitters in the dual-fiber O-UPSR network. The transport capacity of a 10 Gb/s, 100-GHz-spaced, two-fiber O-UPSR system can be maintained in a single-fiber O-UPSR network based on FIG. 1 by generating two duplicated, 50-GHz-spaced 10 Gb/s signals via a single optical DSB-SC transmitter.

Referring back to FIG. 1, the illustrated node structure is only one example of various node structures that can be used to use DSB-SC modulation to supply WDM signals to a single-fiber ring in an O-UPSR configuration. The operation of the ring in FIG. 1 illustrates one specific implementation of a method for communications in a single-fiber ring that includes optical nodes and a single fiber optically coupled between two adjacent optical nodes. In this method, a signal channel is launched into the optical ring as a first optical signal at a first optical wavelength-division-multiplexed (WDM) frequency along a first direction in the optical ring and a second optical signal at a second, different optical WDM frequency along a second, opposite direction. Different signal channels are launched in the optical ring in different first optical signals at different first WDM frequencies and different second optical signals at different second WDM frequencies, respectively. In launching a signal channel into the optical ring from an optical node, an optical double sideband modulation is applied in modulating an optical carrier beam at an optical carrier frequency to modulate the optical carrier beam in response to at least one modulating signal at a modulation frequency carrying a signal channel as a baseband signal to produce a modulated optical beam carrying a first modulated optical carrier at the first optical WDM frequency greater than the optical carrier frequency by the modulation frequency and a second modulated optical carrier at the second optical WDM frequency less than the optical carrier frequency by the modulation frequency while energy at the optical carrier frequency is suppressed. The modulated optical beam is split into a first optical add signal and a second optical add signal. The light at the first optical WDM frequency in the first optical add signal is selected to propagate along the first direction into the optical ring as the first optical signal carrying the baseband signal while blocking light at the second optical WDM frequency from propagating along the first direction in the optical ring. The light at the second optical WDM frequency in the second optical add signal is selected to propagate along the second direction into the optical ring as the second optical signal carrying the baseband signal while blocking light at the first optical WDM frequency from propagating along the second direction in the optical ring.

In each optical node, light at the first optical WDM frequency is coupled out of the first optical path as a first optical drop signal while transmitting light at frequencies different from the first optical WDM frequency along the first optical path. In the second optical path, the light at the second optical WDM frequency is coupled out of the second optical path as a second optical drop signal from the second optical path while transmitting light at frequencies different from the second optical WDM frequency along the second optical path. One of the first and the second optical drop signals is selected as the default drop signal and is switched to an optical detector for detection and when the selected drop signal becomes absent, the other drop signal is switched to the optical detector for detection.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations and enhancements may be made.

What is claimed is:

1. An optical communication system comprising:
   an optical ring comprising a plurality of optical nodes and a single fiber optically coupled between two adjacent optical nodes of the plurality of optical nodes to connect the plurality of optical nodes into the optical ring,
   wherein the optical ring launches a signal channel as a first optical signal at a first optical wavelength-division-multiplexed (WDM) frequency along a first direction in the optical ring and a second optical signal at a second, different optical WDM frequency along a second, opposite direction and launches different signal channels at different first WDM frequencies and different second WDM frequencies, respectively, and
   wherein each optical node comprises:
   a first node terminal to connect to the optical ring at a first side of the optical node;
   a second node terminal to connect to the optical ring at a second, opposite side of the optical node;

a first optical path within the optical node to carry light along the first direction from the first node terminal to the second node terminal;

a second, separate optical path with the optical node to carry light along the second direction from the second node terminal to the first node terminal;

an optical transmitter to produce an optical carrier beam at an optical carrier frequency and to modulate the optical carrier beam in response to at least one modulation signal at a modulation frequency carrying a signal channel as a baseband signal to produce a modulated optical beam carrying a first modulated optical carrier at the first optical WDM frequency greater than the optical carrier frequency by the modulation frequency and a second modulated optical carrier at the second optical WDM frequency less than the optical carrier frequency by the modulation frequency while energy at the optical carrier frequency is suppressed;

an optical splitter to split the modulated optical beam from the optical transmitter into a first optical add signal and a second optical add signal;

a first optical WDM add unit to couple the first optical add signal to the first optical path and select light at the first optical WDM frequency to propagate along the first direction while blocking light at the second optical WDM frequency from propagating in the first optical path and transmitting light at frequencies different from the second optical WDM frequency;

a second optical WDM add unit to couple the second optical add signal to the second optical path and select light at the second optical WDM frequency to propagate along the second direction while blocking light at the first optical WDM frequency from propagating in the second optical path and transmitting light at frequencies different from the first optical WDM frequency;

a first optical WDM terminal unit coupled at the first node terminal to connect the first and second optical paths to the optical ring to transmit light at the first optical WDM frequency in the first optical path into optical ring along the first direction, and to transmit light at the second optical WDM wavelength from the optical ring into the second optical path along the second direction; and a second optical WDM terminal unit coupled at the second node terminal to connect the first and second optical paths to the optical ring to transmit light at the second optical WDM frequency in the second optical path into optical ring along the second direction, and to transmit light at the first optical WDM wavelength from the optical ring into the first optical path along the first direction.

2. The system as in claim 1, wherein each optical node further comprises:

a first optical drop unit coupled in the first optical path between the second optical WDM terminal unit and the first optical add unit to drop light at the first optical WDM frequency as a first optical drop signal from the first optical path while transmitting light at frequencies different from the first optical WDM frequency along the first optical path;

a second optical drop unit coupled in the second optical path between the first optical WDM terminal unit and the second optical add unit to drop light at the second optical WDM frequency as a second optical drop signal from the second optical path while transmitting light at frequencies different from the second optical WDM frequency along the second optical path;

an optical detector; and an optical switch coupled between the optical detector and the first, second optical drop units to receive the first and the second optical drop signals, the optical switch operable to select one of the first and the second optical drop signals to be received by the optical detector.

3. The system as in claim 1, wherein the first optical WDM terminal unit is an optical WDM interleaver.

4. The system as in claim 3, wherein an optical signal in the first optical path in each optical node is at an even numbered channel of the optical WDM interleaver and an optical signal in the second optical path in each optical node is at an odd numbered channel of the optical WDM interleaver.

5. The system as in claim 1, wherein the first optical add unit is an optical WDM multiplexer.

6. The system as in claim 1, wherein the first optical drop unit is an optical WDM demultiplexer.

7. The system as in claim 1, wherein the optical transmitter comprises a laser which produces the optical carrier beam and an Mach-Zehnder interferometer modulator that modulates the optical carrier beam to produce the modulated optical beam.

8. The system as in claim 1, further comprising a switching mechanism to control the optical switch to direct the first optical drop signal to the optical detector and to control the optical switch to direct the second optical drop signal to the optical detector when the first optical drop signal becomes absent.

9. A method for communications in an optical communication system comprising a plurality of optical nodes and a single fiber optically coupled between two adjacent optical nodes of the plurality of optical nodes to connect the plurality of optical nodes into an optical ring, comprising:

launching into the optical ring a signal channel as a first optical signal at a first optical wavelength-division-multiplexed (WDM) frequency along a first direction in the optical ring and a second optical signal at a second, different optical WDM frequency along a second, opposite direction;

launching different signal channels in different first optical signals at different first WDM frequencies and different second optical signals at different second WDM frequencies, respectively;

in launching a signal channel into the optical ring from an optical node, applying an optical double sideband modulation in modulating an optical carrier beam at an optical carrier frequency to modulate the optical carrier beam in response to at least one modulating signal at a modulation frequency carrying a signal channel as a baseband signal to produce a modulated optical beam carrying a first modulated optical carrier at the first optical WDM frequency greater than the optical carrier frequency by the modulation frequency and a second modulated optical carrier at the second optical WDM frequency less than the optical carrier frequency by the modulation frequency while energy at the optical carrier frequency is suppressed;

splitting the modulated optical beam into a first optical add signal and a second optical add signal;

selecting light at the first optical WDM frequency in the first optical add signal to propagate along the first direction into the optical ring as the first optical signal carrying the baseband signal while blocking light at the second optical WDM frequency from propagating along the first direction in the optical ring; and selecting light at the second optical WDM frequency in the second optical add signal to propagate along the second direction into the optical ring as the second optical signal carrying the baseband signal while blocking light at the first optical WDM frequency from propagating along the second direction in the optical ring.

10. The method as claim 9, comprising:

coupling light at the first optical WDM frequency along the first direction as a first optical drop signal while transmitting light at frequencies different from the first optical WDM frequency along the first direction;

coupling light at the second optical WDM frequency along the second direction as a second optical drop signal while transmitting light at frequencies different from the second optical WDM frequency along the second direction;

selecting the first optical drop signal as a default drop signal to an optical detector for detection; and when the first optical drop signal becomes absent, switching the second optical drop signal to the optical detector for detection.

11. The method as in claim 9, comprising:

using a Mach-Zehnder modulator to perform the optical double sideband modulation in modulating the optical carrier beam, wherein the modulating comprising splitting the optical carrier beam into a first optical carrier beam into a first optical path of the Mach-Zehnder modulator and a second optical carrier beam into a second optical path of the Mach-Zehnder modulator, and applying a phase shift of 180 degrees between the first and second optical paths to suppress energy at the optical carrier frequency in the modulated optical beam.

12. The method as in claim 9, comprising:

using a first optical WDM interleaver in each optical node to connect first and second optical paths, that respectively carry light in the first and second directions, to transmit light in the first optical path in one or more even numbered optical channels of the first optical WDM interleaver into optical ring along the first direction, and to transmit light in the second optical path in one or more odd numbered optical channels of the first optical WDM interleaver into the optical ring along the second direction; and a second optical WDM interleaver in each optical node to connect other ends of the first and second optical paths to transmit light in the second optical path in one or more odd numbered optical channels of the second optical WDM interleaver into optical ring along the second direction, and to transmit light in the first optical path in one or more even numbered optical channels of the second optical WDM interleaver into the optical ring along the first direction.

\* \* \* \* \*